US007730979B2

(12) United States Patent
Kahrig

(10) Patent No.: US 7,730,979 B2
(45) Date of Patent: Jun. 8, 2010

(54) METHOD OF, AND APPARATUS FOR, CLEANING THE EXTERIOR OF TUBING

(75) Inventor: Randy Kahrig, 800 Scott St., Worthington, KY (US) 41183

(73) Assignee: Randy Kahrig, Worthington, KY (US)

( * ) Notice: Subject to any disclaimer, the term of this patent is extended or adjusted under 35 U.S.C. 154(b) by 875 days.

(21) Appl. No.: 11/594,254

(22) Filed: Nov. 7, 2006

(65) Prior Publication Data

US 2007/0102902 A1 May 10, 2007

Related U.S. Application Data

(60) Provisional application No. 60/734,308, filed on Nov. 7, 2005.

(51) Int. Cl.
*B62B 1/00* (2006.01)

(52) U.S. Cl. ....................................... 180/9.1; 239/172

(58) Field of Classification Search ................. 122/383, 122/390, 392; 180/164, 9, 9.32, 9.1; 239/751, 239/752
See application file for complete search history.

(56) References Cited

U.S. PATENT DOCUMENTS

| | | | | |
|---|---|---|---|---|
| 4,100,887 | A * | 7/1978 | Malmstrom et al. | 122/379 |
| 4,218,016 | A | 8/1980 | Freund | 239/186 |
| 4,503,811 | A | 3/1985 | Hammond | 122/392 |
| 4,887,555 | A * | 12/1989 | Smet | 122/382 |
| 4,932,831 | A * | 6/1990 | White et al. | 414/732 |
| 5,022,812 | A * | 6/1991 | Coughlan et al. | 414/729 |
| 5,230,306 | A | 7/1993 | Barringer et al. | 122/383 |
| 5,271,356 | A | 12/1993 | Kling et al. | 122/392 |
| 5,366,038 | A * | 11/1994 | Hidetsugu et al. | 180/164 |
| 5,379,727 | A | 1/1995 | Kling et al. | 122/392 |
| 5,509,607 | A | 4/1996 | Booher et al. | 239/289 |
| 5,733,092 | A * | 3/1998 | Barry | 414/337 |
| 6,283,069 | B1 | 9/2001 | Bude et al. | 122/379 |
| 6,513,462 | B1 * | 2/2003 | Shiraishi et al. | 122/382 |
| 7,118,629 | B2 * | 10/2006 | Davidson | 118/323 |
| 2006/0278454 | A1 * | 12/2006 | Maggio | 180/164 |
| 2008/0001005 | A1 * | 1/2008 | Weaver et al. | 239/225.1 |

* cited by examiner

*Primary Examiner*—Tony H. Winner
(74) *Attorney, Agent, or Firm*—Harness, Dickey & Pierce, P.L.C.

(57) ABSTRACT

An apparatus for cleaning a bank of tubing includes a small, portable, mobile, remote controlled cart that travels over the surface of the banking of tubing and directs at least one high pressure fluid jet onto the surfaces of the tubes comprising the banks of tubing over which the cart is traveling. A method of cleaning the exterior of a bank of tubing includes traversing a small, portable, mobile, remote controlled cart over the surface of the bank of tubing, and directing a high pressure water generally downwardly toward the tubing as the cart traverses the surface of the bank of tubing.

8 Claims, 5 Drawing Sheets

METHOD OF, AND APPARATUS FOR, CLEANING THE EXTERIOR OF TUBING

BACKGROUND

This invention relates to methods of and apparatus for cleaning the exterior of banks of tubing, such as the banks of tubing in a heat exchanger.

Heat exchangers, such as those used in boilers, typically consist of banks of tubing over which hot combustion gases are passed to heat fluid circulating through the tubes. Overtime dirt and debris build up on the outsides of the tubes, impairing heat transfer, and it becomes necessary to clean the exterior of the bank of tubes. However, because of their location and configuration, this cleaning process can be very difficult and time consuming.

SUMMARY OF THE INVENTION

Embodiments of the present invention provide methods of, and apparatus for, cleaning the exterior of banks of tubing. In accordance with some embodiments of this invention, a method of cleaning banks of tubing is provided comprising remotely controlling a cart to traverse the surface of the bank of tubes and direct one or more high pressure fluid jets onto the surfaces of the bank of tubes. In accordance with other embodiments of this invention, an apparatus for cleaning banks of tubing is provided that comprises a small, portable, mobile, remote controlled cart that can traverse the a bank of tubing and direct high pressure water over the surfaces of the bank of tubing as it moves.

Various embodiments of the invention make it possible to clean banks of tubing, such as the banks of tubing in commercial and industrial boilers. At least some of the embodiments allow cleaning of banks of tubes that are difficult or dangerous to access. At least some embodiments allow the cleaning of banks of tubing when the conditions are inhospitable to the presence of humans. These and other features and advantages of the various embodiments of the invention will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF EMBODIMENTS

Figure 1:
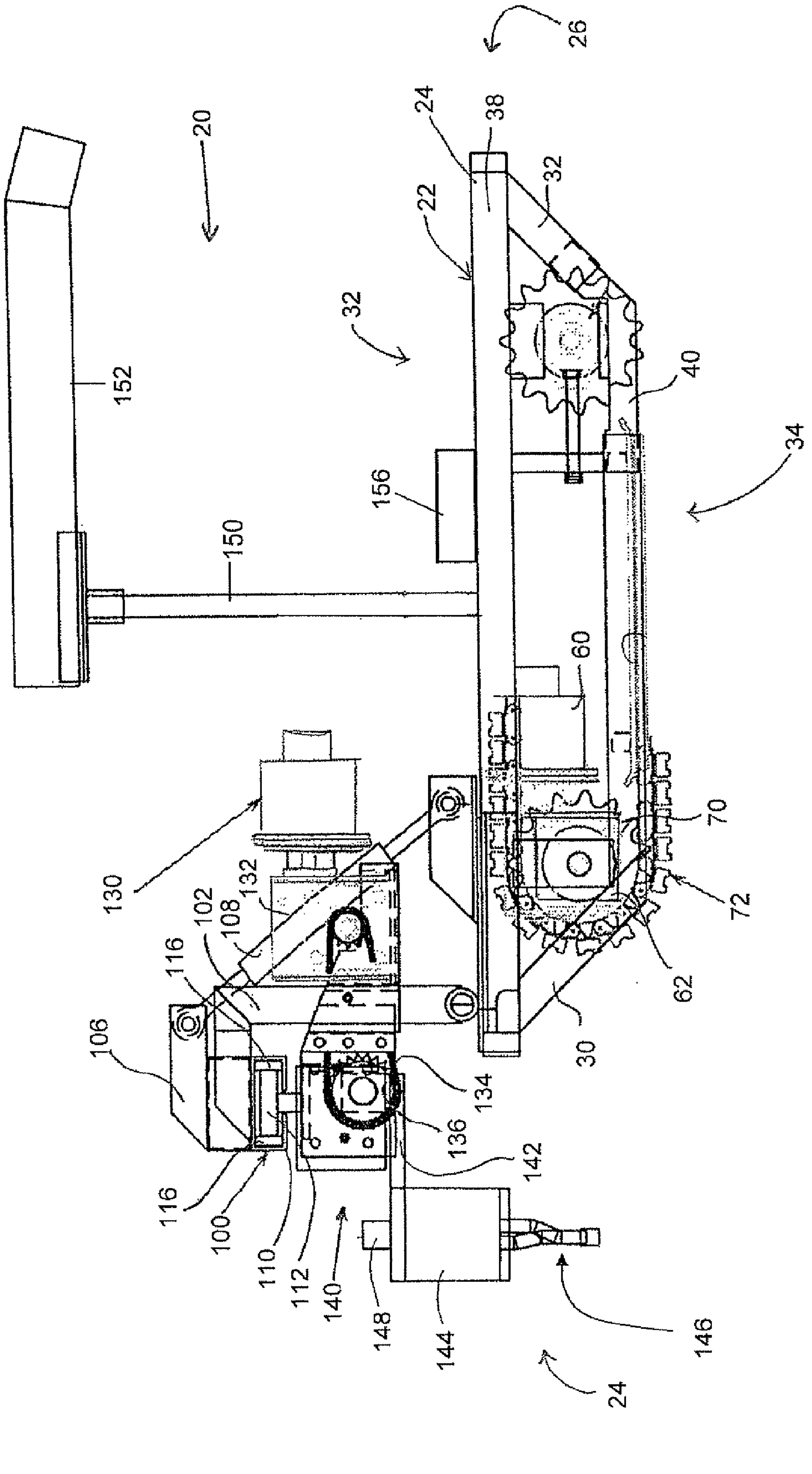
FIG. 1 is a side elevation view of a preferred embodiment of a cart constructed according to the principles of this invention.
Figure 2:
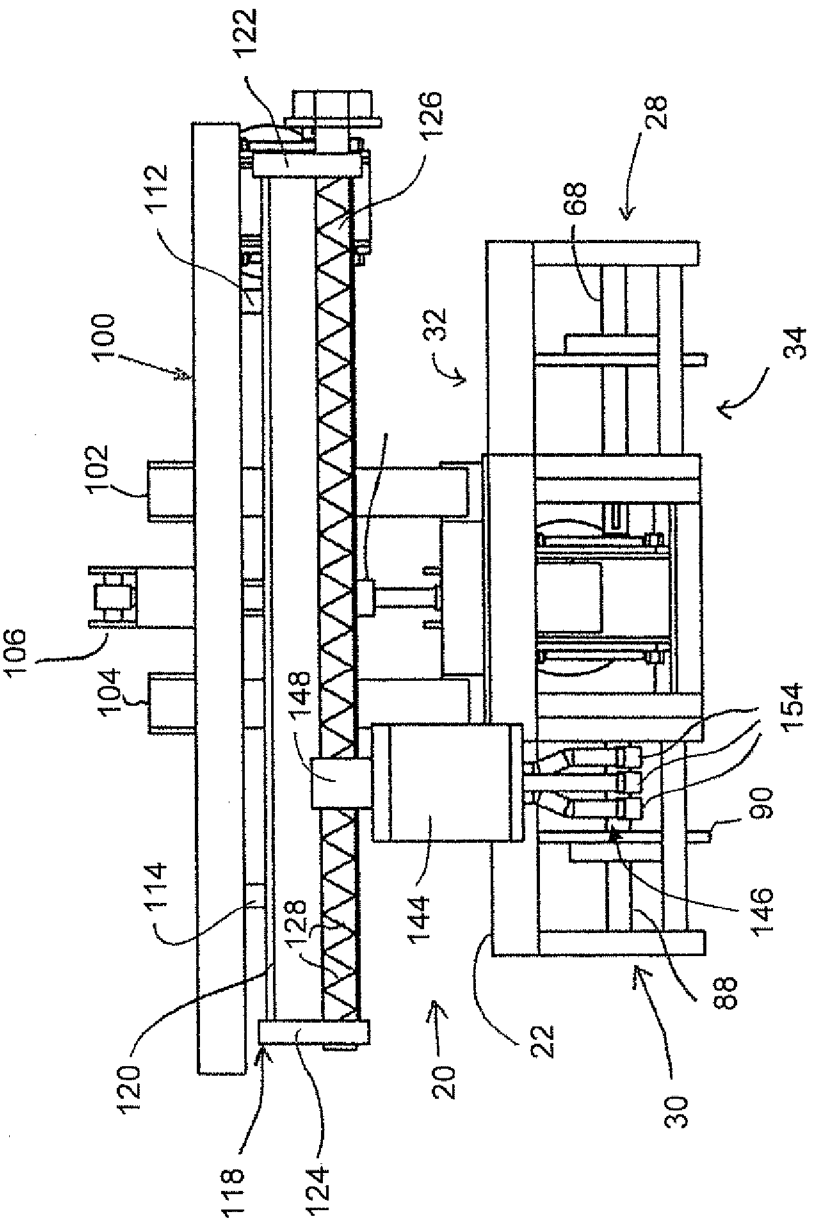
FIG. 2 is a front elevation view of the cart.
Figure 3:
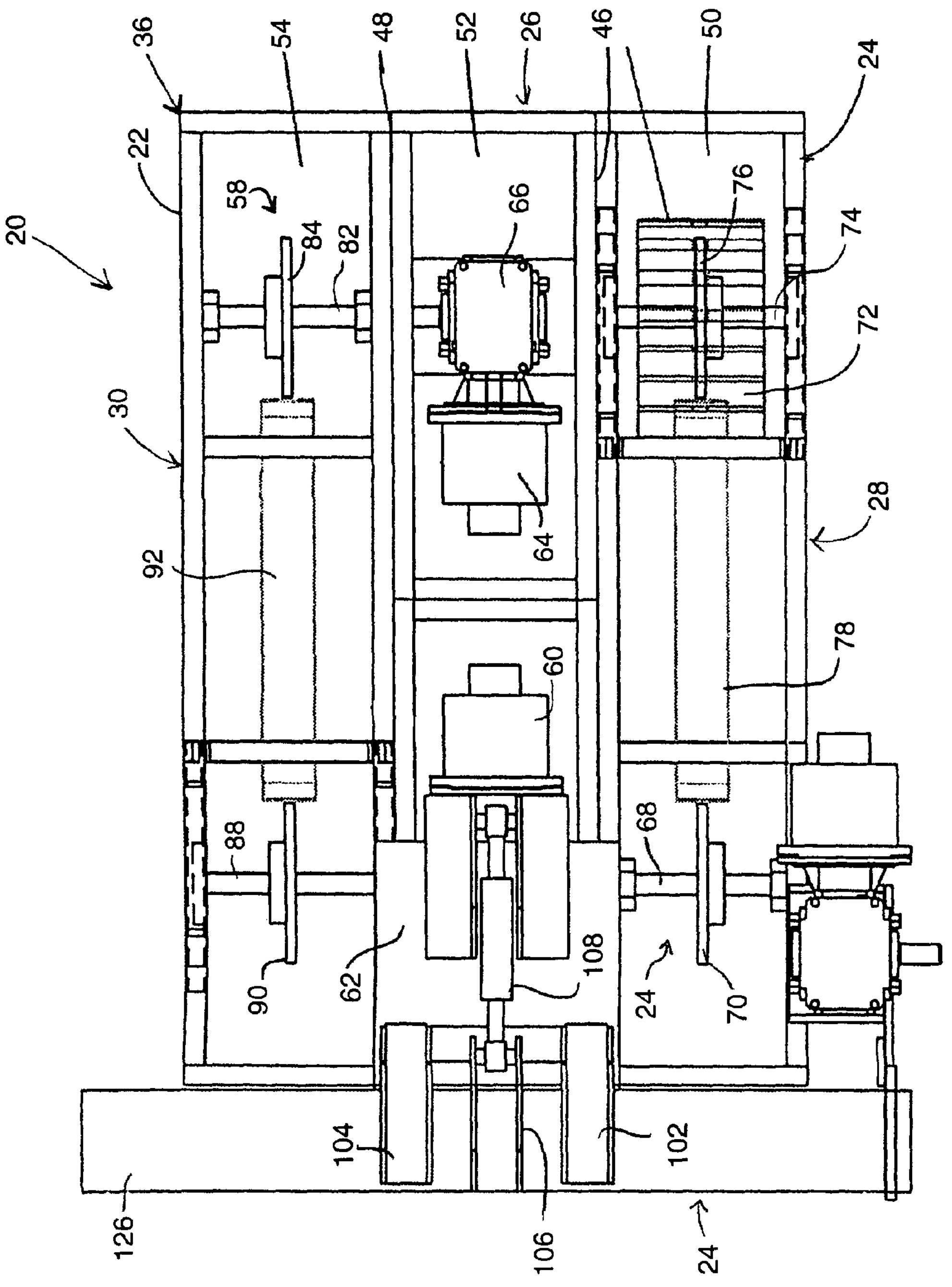
FIG. 3 is a top plan view of the cart.
Figure 4A:
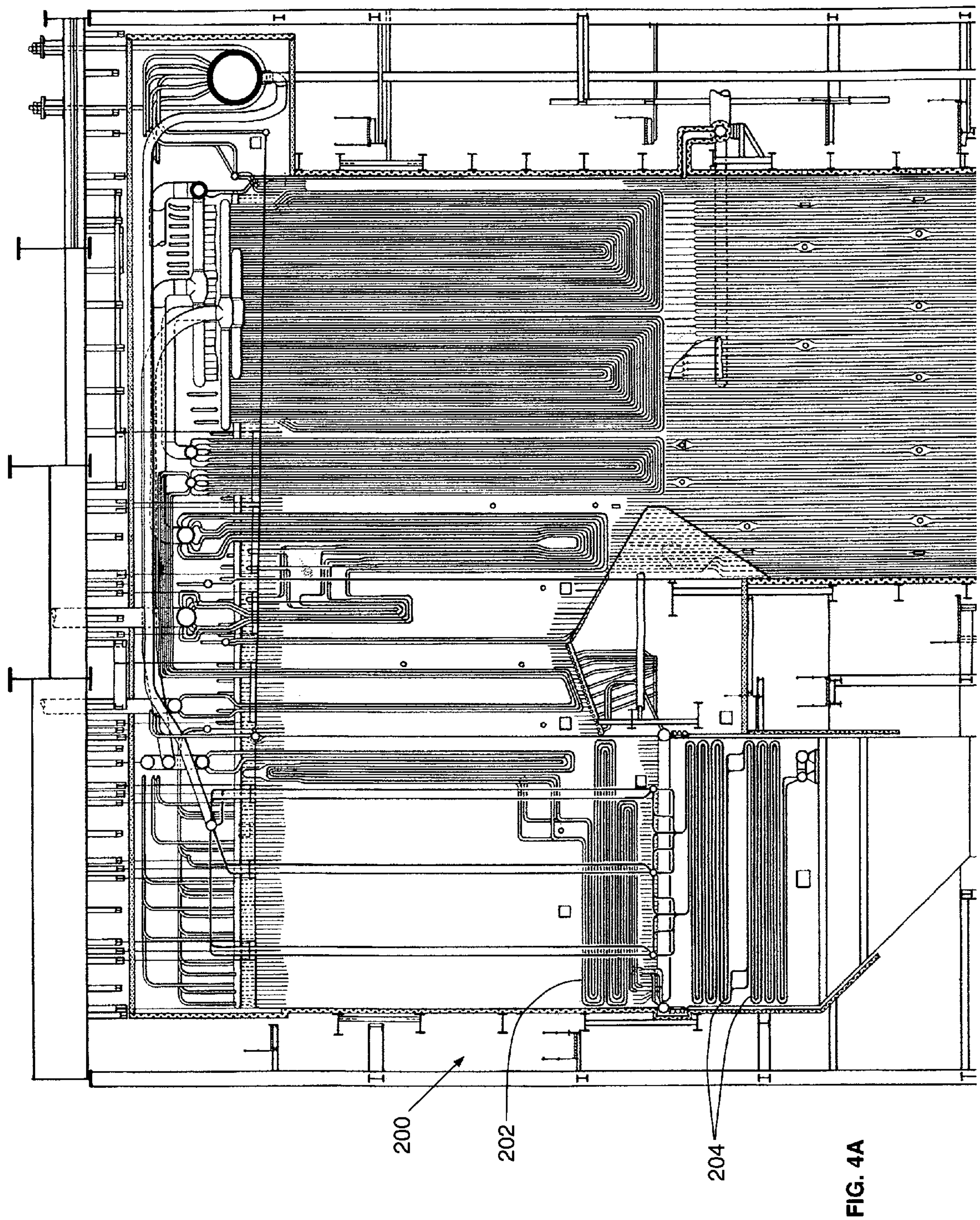
FIG. 4A is a vertical cross sectional view of a commercial boiler.
Figure 4B:
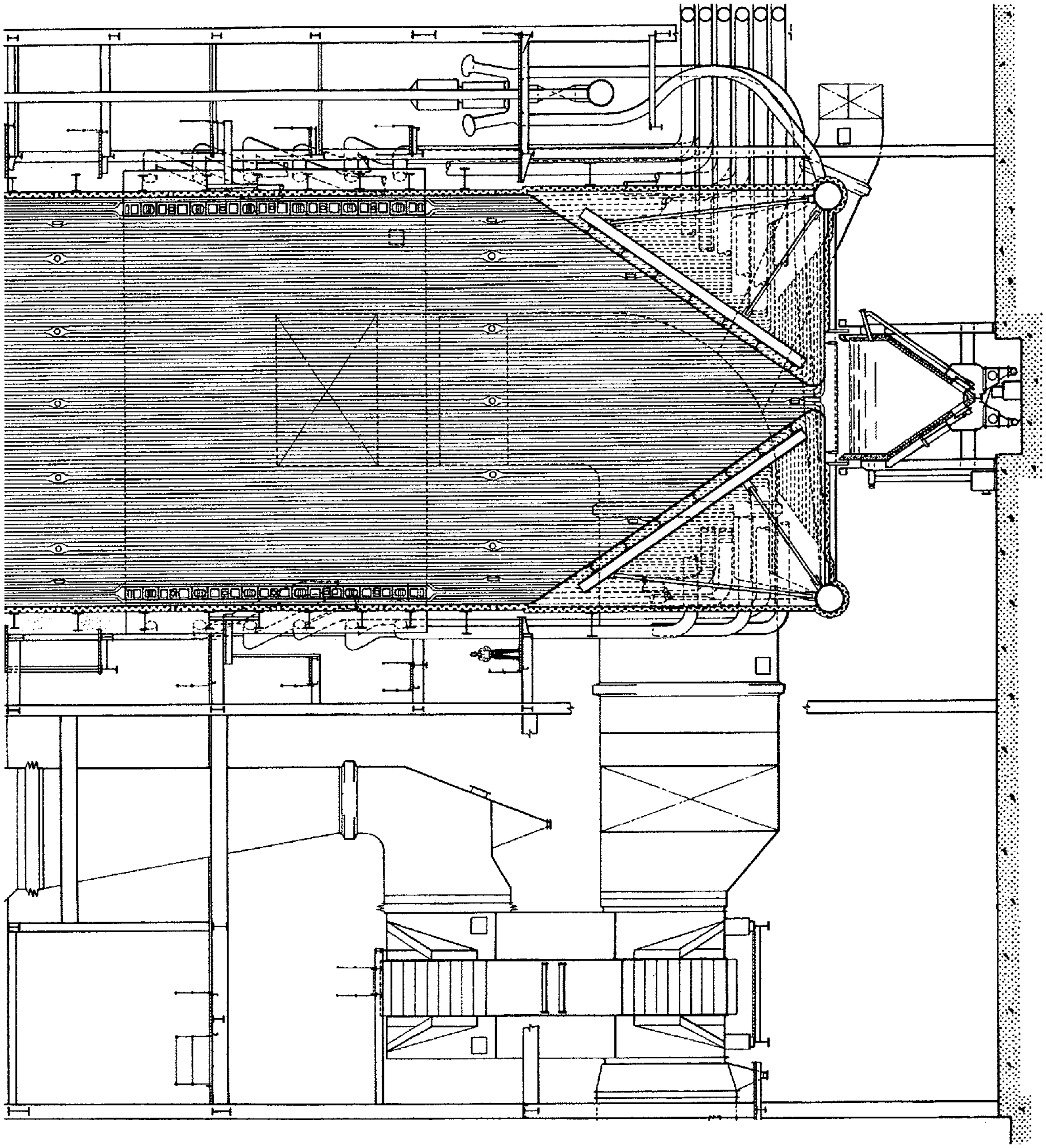
FIG. 4B is a vertical cross sectional view of a commercial boiler.

A preferred embodiment of an apparatus for cleaning banks of tubing, such as those forming a part of a heat exchanger in a boiler as shown in FIGS. 4A-4B, is indicated generally as 20 in FIGS. 1-3. The apparatus 20 includes a small, portable, mobile, remote controlled cart 22 that can direct high pressure water over the bank of tubes as it moves across the bank of tubes.

The cart 22 has a front 24, a back 26, left and right sides 28 and 30, and top 32 and bottom 34. The cart 22 comprises a chassis 36, which in this preferred embodiment is shaped like an inverted trapezoidal prism (see FIG. 1), having a top 38, a bottom 40, front member 42 and rear member 44. The cart 32 further comprises two longitudinally extending walls 46 and 48 (FIG. 3), which divide the interior of the chassis 36 into left, center, and right sections 50, 52, and 54. A left chain drive mechanism 56 is disposed in the left section 50 of the chassis 36, a right chain drive mechanism 58 is disposed in the right section 54 of the chassis. An air motor 60 and reduction gear 62 is mounted in the center section 52 to drive the left chain drive mechanism 56, and an air motor 64 and reduction gear 66 is provided in the center section 52 to drive the right chain mechanism 58. The use of air motors 60 and 64 makes the cart 22 more tolerant to heat and harsh conditions, and also permits sensitive controls to be located remote from the cart, however other drive mechanism. As described in more detail below, one or both of the chain mechanisms 56 and 58 can be selectively operated to move the cart 22 forward, turn the cart, or move the cart rearwardly.

The left chain drive mechanism 56 comprises a front axle 68 rotatably mounted in the chassis 36 near the front 24 of the cart 22, and which is driven by the reduction gear 62, which is in turn driven by air motor 60. A sprocket 70 is mounted on front axle 68 to engage and drive chain tread 72. A rear axle 74 is slidably mounted near the rear 26 of the cart. A sprocket 76 is mounted on the rear axle 74 of the cart 22. The sprocket 76 can free wheel on the rear axle 74, or it can be fixed to the rear axle, in which case the rear axle is rotatably mounted. The sprocket 76 engages the chain tread 72. A spring 78, which can be a gas spring or mechanical spring unit, biases the rear axle 74 rearwardly to keep the chain tread 72 properly tensioned. The spring 78 helps accommodate thermal expansion and contraction of the parts that occur with temperature changes. A skid plate 80 is preferably mounted adjacent the bottom 26 of the cart 22, to help support the chain tread 72.

The right chain drive mechanism 58 comprises a rear axle 82 rotatably mounted near the rear 26 of the cart 22, which is driven by the reduction gear 66, which is in turn driven by air motor 64. A sprocket 84 is mounted on rear axle 70 to engage and drive chain tread 86 (similar to chain tread 72). A front axle 88 is slidably mounted near the front 24 of the cart 22. A sprocket 90 is mounted on the front axle 88 of the cart 22. The sprocket 90 can free wheel on the front axle 88, or it can be fixed to the rear axle, in which case the front axle is also rotatably mounted. The sprocket 90 engages the chain tread 86. A spring 92, which can be a gas spring or mechanical spring unit, biases the front axle 88 forwardly to keep the chain tread 86 properly tensioned. The spring 92 helps accommodate thermal expansion and contraction of the parts that occur with temperature changes. A skid plate (not shown) is preferably mounted adjacent the bottom 34 of the cart 22, to help support the chain tread 86.

A transverse support 100 is mounted at the front 24 of the cart 22 by two inverted L-shaped brackets 102 and 104, which are pivotally mounted at their lower ends to the top 32 of the cart 22. A bracket 106 is mounted on top of the transverse support 100, and a heavy duty turn buckle 108 extends between the bracket 106 and the top 32 of the cart 22. The turn buckle 108 allows the angular orientation of the support 100, and the water jet system carried on the support, to be adjusted, as is described in more detail below. The support 100 preferably comprising a downwardly facing C-shaped track 110. Two T-shaped mounts 112 and 114 have roller bearings 116 on the ends of the "T" to translate in the C-shaped track 110. The stem of the T supports a frame 118 (FIG. 2), comprising a top 120 and left and right sides 122 and 124, which rotatably mount a shaft 126 with crisscrossing tracks 128 forming a diamond pattern. An air motor 130 operates a reduction gear 132 to drive a chain 134 which drives a gear 136 on the shaft 126.

A spray unit 140 includes a carriage 142 mounted on the shaft 126 and engages the tracks 128 thereon to translate along the length of the shaft as the shaft is rotated. A distribution nozzle bracket 144 is mounted on the carriage 142, and at least one nozzle, and in this preferred embodiment three discharge nozzles 146 are mounted on the bracket 144, and point generally downwardly. The nozzles 146 each communicate with a common inlet 148 which is adapted to be connected to a source of fluid under pressure.

The top of the support 100 and/or the top of the cart 22 can be adapted to receive and engage removable weights 156 for stabilizing the cart 22 against reaction forces from the jets 154 exiting the nozzles 146.

A post 150 projects upwardly from the top of the cart 22, and a channel 152 is mounted on the top of the post, for supporting and directing leads to the air motors for operating the cart 22, and a fluid supply line for providing fluid under pressure to the inlet 148.

The cart 20 is preferably made so that it can be quickly assembled from, and disassembled from parts that easily fit through the manhole openings in commercial boilers (typically a 16 inch×18 inch oval). The three part construction of the cart in section 50, 52, facilitates this assembly and disassembly. Each of these sections is preferably no greater than about 12 inches wide, and no higher than about 18 inches so that the sections can be passed through a manhole, and assembled into the cart 22. In a preferred embodiment, the cart 22 has an assembled dimension of about 34 inches wide by about 64 inches long. The fluid pressure lines are connected between the pump and the cart 22 and preferably provide the cart with fluid (e.g. water) under a pressure of about 5,000 psi to about 10,000 psi, and a flow rate of about 200 to about 300 gallons per minute. Various cleaners, detergents, solvents, etc. could be added to water, or some other fluid could be used.

Of course the cart 22 could be made in other sizes, small for smaller applications or larger for larger applications.

Operation

In operation the cart 22 is transported to the location of a bank of tubes 202 and set up. Air lines are connected to the air motors 60, 64, and 133, and a high pressure fluid (preferably water) line is connected to the inlet 148. Weights may be mounted on the support 100 or on the top 32 of cart 22. The weights help stabilize the cart 22 against reaction forces from fluid jets exiting the nozzles 146, and providing separate weights allows the cart 22 to be more easily transported.

The orientation of the nozzles 146 can then be adjusted using the turnbuckle 108. Extending the turnbuckle 108 causes the nozzles 146 to point rearwardly toward the cart, shortening the turnbuckle 108 causes the nozzles 146 to point forwardly away from the cart. Once the nozzles are in their desired operation, the cart is ready for use. Pressurized air is selectively supplied to the air motors 60 and 64 to move the chain treads 72 and 86 forwardly and rearwardly to cause the cart 22 to move itself to and over the surface of a bank of tubes. As the cart 22 traverses the surface of the bank of tubes, high pressure fluid (preferably water without or without cleaning agents, detergents, or solvents) is supplied via a high pressure fluid line to the inlet 148 to cause a jet of the fluid to exit each of the nozzles 146, generally downwardly, in a direction determined by the orientation of the spray unit 140. The cart 22 can be controlled to traverse the top surface of the bank of tubes, directing jets of fluid downwardly onto the surfaces of the tubes forming the tube bank. Air under pressure can be provided to air motor 130 to turn the shaft 126 and cause the spray unit 140 to move transversely with respect to the cart 22. This transverse motion of the spray unit 140 allows the nozzles 146 to cover a greater surface area of the tubes with less maneuvering of the cart 22. When the cart 22 has cleaned the surfaces tubes in the bank of tubes, the cart is simply operated to a convenient access point where the cart can be dissembled and removed.

Thus the use of a cart allows banks of tubes to be cleaned that are difficult or impossible for humans to access directly. The cart also allows tubes to be cleaned while the tubes are in still in service, or at least under conditions where it would not be desirable or safe for humans to access and clean the tubes directly. The cart can be small enough and light weight enough to be relatively easily transported, and the use of separate weights facilitate the transportation of the cart, yet provides sufficient weight to stabilize the cart.

What is claimed is:

1. A method of cleaning the exterior of a bank of tubing inside a boiler, the method comprising assembling a remotely controllable cart inside the boiler, adjacent the tube bank, the cart having at least one nozzle for directing a high pressure fluid jet generally downwardly; remotely controlling the cart to traverse the surface of the bank of tubing; directing a high pressure fluid jet from the at least one nozzle downwardly as the cart traverses over the bank of tubing.

2. The method of claim 1 further comprising translating the at least one nozzle transversely with respect to the direction of travel of the cart as the cart traverses the surface of the bank of tubing.

3. The method of claim 1 wherein the step of assembling the cart comprises putting weights on the cart to stabilize the cart from reaction forces from the at least one nozzle.

4. The method according to claim 1 wherein the cart comprises at least two track drives, and wherein the step of traversing the cart over the surface of the bank of tubes comprises separately controlling the track drives to move the cart over the surface of the bank of tubing.

5. The method according to claim 4 wherein the track drives are driven by air motors, and the step of controlling the track drives comprises controlling the track drive's respective air motors.

6. The method according to claim 5 further comprising moving the at least one high pressure fluid jet transversely with respect to the direction of motion of the cart.

7. The method according to claim 6 further comprising the step of adjusting a pivotal support for changing the angle of the nozzle in a plane parallel to the direction to the track drives.

8. The method according to claim 7 wherein there are a plurality of nozzles providing a plurality of high pressure fluid jets, at least two of which are oriented in different directions.

* * * * *